(12) United States Patent
Ambilkar et al.

(10) Patent No.: US 7,509,640 B2
(45) Date of Patent: Mar. 24, 2009

(54) TASK DISTRIBUTION IN COMPUTING ARCHITECTURES

(75) Inventors: Shridhar Ambilkar, Bangalore (IN); Ashutosh Misra, Bangalore (IN); Raju B Pudota, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1180 days.

(21) Appl. No.: 10/736,297

(22) Filed: Dec. 15, 2003

(65) Prior Publication Data

US 2005/0132370 A1 Jun. 16, 2005

(51) Int. Cl.
G06F 9/46 (2006.01)
G06F 9/26 (2006.01)

(52) U.S. Cl. ............... 718/100; 718/102; 711/201

(58) Field of Classification Search ......... 718/100–105; 711/201
See application file for complete search history.

(56) References Cited

U.S. PATENT DOCUMENTS

| | | | | |
|---|---|---|---|---|
| 3,744,033 A | * | 7/1973 | Boyd | ............ 715/210 |
| 4,325,120 A | * | 4/1982 | Colley et al. | ............ 711/202 |
| 4,433,389 A | * | 2/1984 | York et al. | ............ 711/216 |
| 5,293,620 A | * | 3/1994 | Barabash et al. | ............ 718/102 |
| 2004/0003022 A1 | * | 1/2004 | Garrison et al. | ............ 709/105 |

* cited by examiner

*Primary Examiner*—Thomas Lee
*Assistant Examiner*—Jennifer N To
(74) *Attorney, Agent, or Firm*—George R. McGuire; Bond Schoeneck & King, PLLC

(57) ABSTRACT

Task distribution is performed in hardware without the use of "division" logic component to divide executions between task execution registers, which advantageously require less silicon when implemented in hardware. Instead, a remainder register is used as a temporary store for the number of task executions yet to distributed to task execution registers. Task execution registers are incremented with a value represented by the data pattern of n MSBs of the number of executions required. Corresponding increment and decrement operations occur until task executions, represented by the data value stored in the remainder register, are effectively distributed to task execution registers.

9 Claims, 5 Drawing Sheets

TASK DISTRIBUTION IN COMPUTING ARCHITECTURES

FIELD OF THE INVENTION

The present invention relates to task distribution in computing architectures.

BACKGROUND

Data processing applications often include task schedulers, which coordinate and control execution of the tasks performed by the data processing application. A task is generally implemented in the form of one or more instructions having a corresponding function. An example task is transferring a segment of data from one part of a memory storage media to another.

More specifically, consider the example of transferring 1 Megabyte (MB) of memory. Conceptually, one task can be assigned to perform this operation. The underlying operating system or computer hardware may not, however, allow the full 1 MB transfer. System resources are held for a relatively long time by such a data transfer, and the amount of data able to be transferred by any particular task may be consequently limited by design. Thus, a data transfer task must in this case be executed multiple times to complete the required 1 MB memory transfer. If an application performs many tasks, and each has a time slot allocated in a "round robin" manner, completing the 1 MB transfer reduces data throughput. This degrades the system performance.

Suppose now that the operating system has a limit on data transfer of 4 Kilobytes (Kb) for each task per execution. To transfer the proposed 1 MB, a data transfer task has to be executed 250 times, which is necessarily time consuming. An alternative is to have multiple tasks performing the same operation.

For example, if 10 tasks are assigned to a data transfer operation, 1 MB of transfer is performed by 10 tasks each executing 25 times. This approach reduces the total execution time as the task sequence performs the same operation in parallel. So, if the execution load is large, and there are multiple tasks, distributing the execution to multiple tasks is advantageous.

Referring to the example above, 250 executions are distributed among 10 task registers equally, each having 25 executions. The number of executions, and the task registers, may vary depending on the application. For example, if 100 executions are required for an application, and there are 9 task registers available, then equal distribution assigns to each task register a value of 11, which makes a total count of 99. The remaining execution is added to the first task register. Accordingly, the first task register executes 12 times, and the remaining 8 task registers each execute 11 times.

A more formally described example of this existing technique is now provided with reference to FIGS. 1 and 2. FIG. 1 presents a flow chart of the steps used for task distribution, while FIG. 2 is a schematic diagram of a hardware implementation of the task distribution technique described with reference to FIG. 1.

Consider an application that requires X number of executions, in this case 23 executions, using Y number of task registers, in this case 5 task registers. This data is read in step 120. Each register shares the execution load equally, if possible. A check is made in step 130 if the data value for the number of executions X is zero. If so, no further action is required. Otherwise, a check is made in step 140 of whether the data value for the number of task registers Y is zero, in which case no further action is required either.

Having made these two preliminary checks in steps 130 and 140, a division operation of X and Y is performed in step 150. The divisor and remainder are stored. In the following step 160, the X number of executions are distributed among the Y number of task registers using the "division method". More specifically, consider distributing 23 executions among 5 task registers. As the quotient from step 150 is 4, and the remainder is 3, each task register is assigned 4 executions, and the remaining 3 executions are distributed as required. The "excess" three remainder executions are distributed to the first three task registers. Thus, in this example, each of the 5 task registers will have 5, 5, 5, 4, 4 assigned executions respectively.

When this regime is realized in hardware, as presented in FIG. 2, the number of executions 205 and task registers 210 are copied to divider logic 260. Besides divider logic 260, the hardware implementation also requires subtract logic 225, control logic 230 and adder logic 245. Adder logic 245 and subtract logic 225 are required to account for arbitrary combinations of executions 205 and tasks registers 210, which can result in remainder results following division.

After division, control logic 230 generates an enable signal DIN_SELECT to get the RESULT 265 values via DIN 255. This RESULT 265, which is in binary form, is then copied into each task count holding register 240. If the REMAINDER 220 is non-zero, then the control logic 230 generates an enable signal to the remainder select 215. This causes the remainder select 215 to pass the new value to remainder 220. The new value of the remainder 220 is calculated by subtracting "1" that from the previous value of the remainder 220 using subtract logic 225.

Correspondingly, control logic 230 also generates an enable signal DIN_SELECT to get the "DOUT+1" value via ADDER LOGIC 245 to DIN 255. The DOUT value is the RESULT 265 stored into each task count holding register.

The control logic 230 is synchronized to generate the enable signals to the REMAINDER SELECT 215 and DIN 255. Every time the REMAINDER 220 gets the new value (previous value less one), the task count holding register 240 value is incremented by 1 via an ADDER LOGIC 245. The control logic 230 then selects the next task count holding register 240.

The above process of subtracting "1" from the remainder 220, adding "1" (incrementing) to the task count holding register 240 and selecting the next task count holding register 240 continues until the REMAINDER 220 becomes zero.

As a result of division via DIVIDE LOGIC 260, if the REMAINDER 220 is zero then only the RESULT 265, which is in binary form, is then copied into each task count holding register 240 via DIN 255.

Task count holding register 240 is implemented as a Random-Access Memory (RAM), and the control block 230 generates an appropriate address, and reads and writes signals to this RAM. The data input to the RAM has two sources. First, the RESULT of the division is selected as input. The selection is performed through the control logic 230. The selected input is then written to the respective task count holding register 240. After writing the result in to selected task count register 240, the REMAINDER distribution occurs.

The remainder register 220 has two sources of inputs. One of the inputs is the remainder of the division from the divide logic 260 via the remainder select 215, and other is the content of remainder register subtracted by 1 every time the remainder is distributed among the task count holding register 240. Control logic 230 generates a select signal to select one of the inputs.

The remainder distribution is done by adding "1" to the contents of the RAM task count holding register 240 until the remainder becomes zero (that is, "1" is subtracted every time the RAM contents are incremented). The control logic 230 generates the select signals for the MUXs, read-write signal for the RAM and an enable signal for divide logic 260. The control logic 230 also generates address of the task count holding register 240 for copying the RESULT and distributing REMAINDER.

"Area critical" applications (in which silicon area of the hardware implementation is a key consideration) require one to minimise all unnecessary logic components. A need clearly exists for any improvement upon existing designs.

SUMMARY

Task distribution is performed in hardware without the use of "division" logic component to divide executions between task execution registers, which advantageously require less silicon when implemented in hardware. Instead, a remainder register is used as a temporary store for the number of task executions yet to distributed to task execution registers.

Corresponding increment and decrement operations occur until task executions, represented by the data value stored in the remainder register are effectively distributed to task execution registers. A refined implementation initialises the task execution registers not with a value of zero but with a value representative of a data pattern of n MSBs of the number of executions required, thereby obviating a corresponding number increment and decrement operations.

The implementation described herein address a particular disadvantage of existing technique described above. Any action that needs be taken on the output of the task count holding register can only happen after copying the RESULT to the task register. Thus, there is a time delay involved from the execute command until the actual execution starts, as division takes few clock cycles. The other requirement is of the division logic block, which is required by existing techniques. The implementation described herein does not require the division logic. The existing technique described above increases the silicon area by the amount of division logic, minimisation of which, is desirable for "area-critical" applications as noted above.

A "division" logic component recurs in existing designs for task distribution hardware, which suggests that this component is though to be essential in such hardware implementations. Division logic requires lot of area, compared to the adder and subtract block. Accordingly, any improvement that is available for improving the hardware implementations for task distribution, especially for "area-critical" applications, is welcome.

DETAILED DESCRIPTION

The implementation described herein requires less silicon area in hardware implementations compared to existing techniques. This reduction is attributable to the lack of division logic. If the control logic supports task distribution in the background, then the task execution can start immediately after a first task distribution. This means that task execution need not wait until complete distribution of the execution job among the task count holding register.

Figure 3:
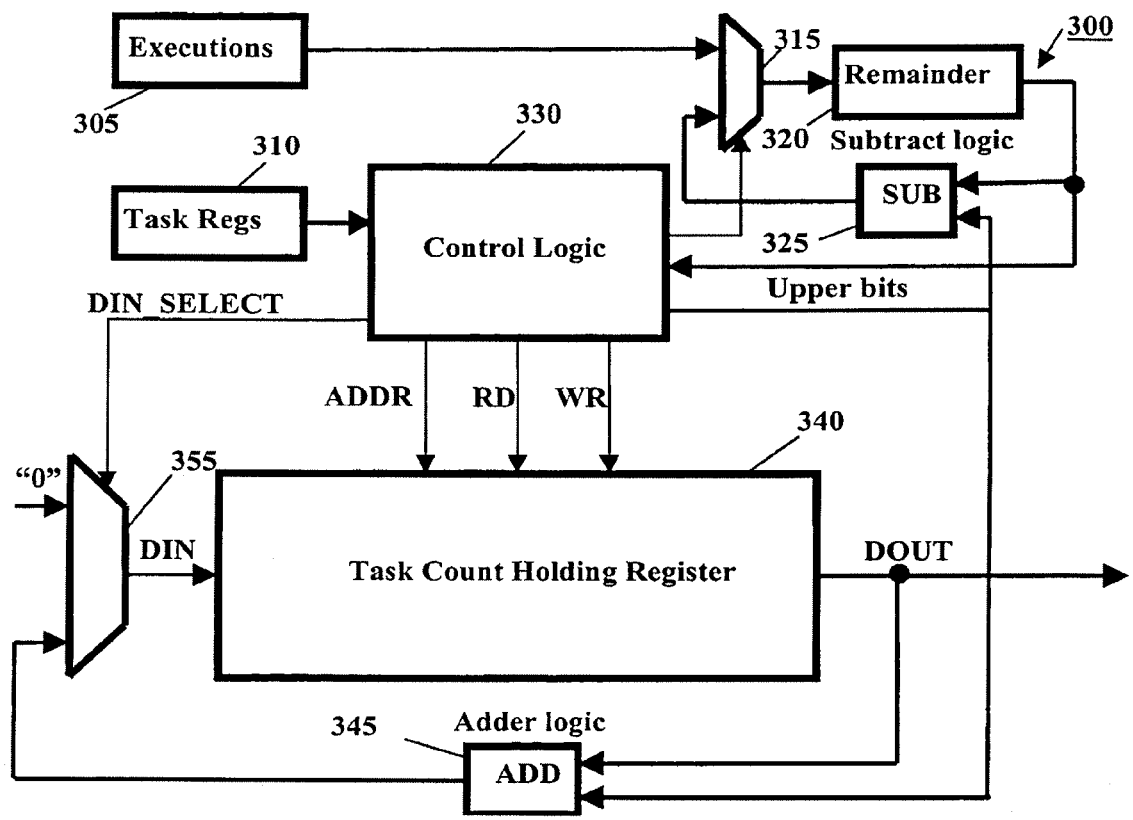
FIG. 3 is a schematic diagram representing a hardware implementation for distributing the number of executions among the task count holding register.
Figure 4A:
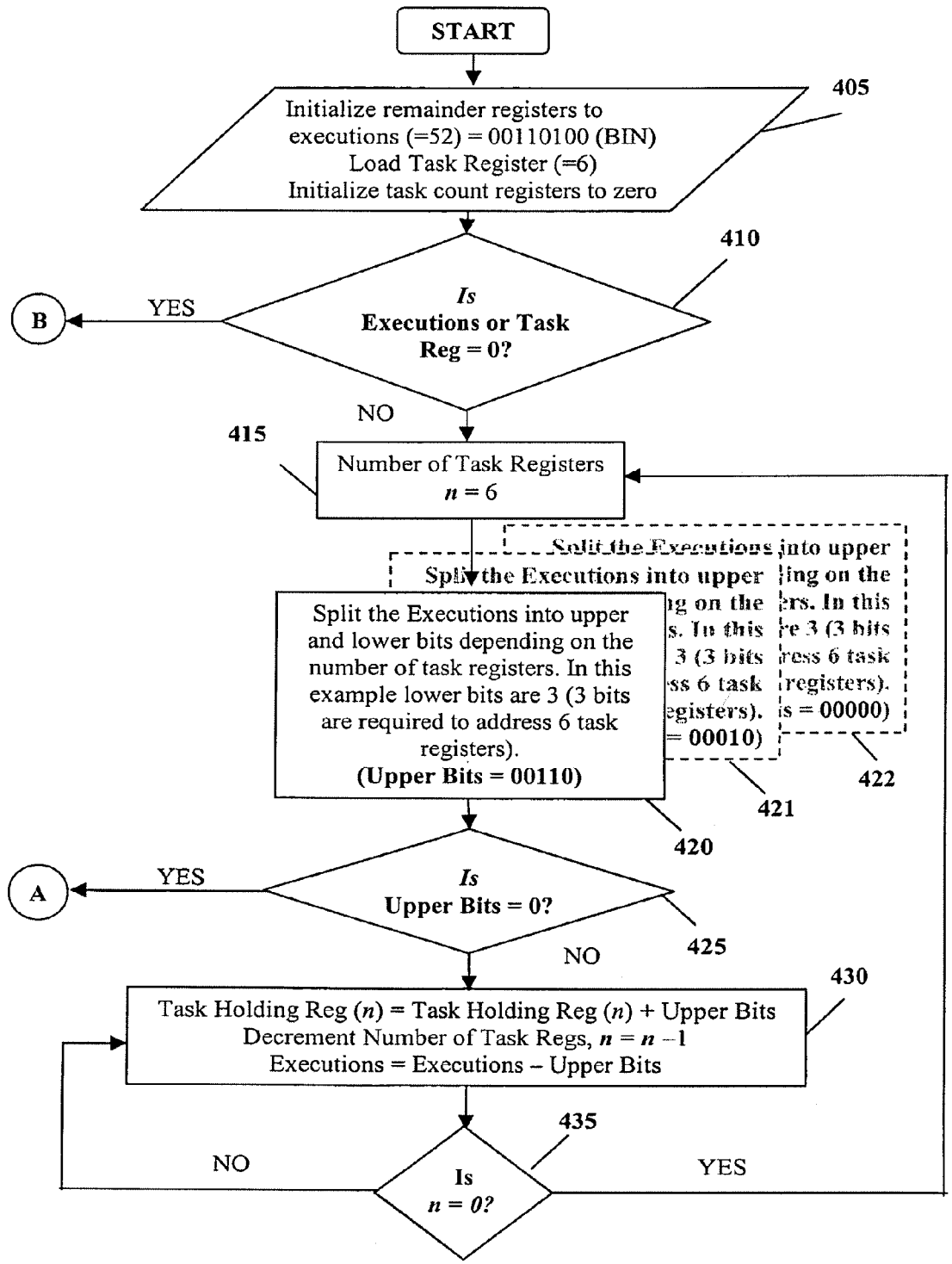
FIGS. 4A and 4B jointly form is a flow chart for distributing the number of executions among the task count holding register.
Figure 4B:
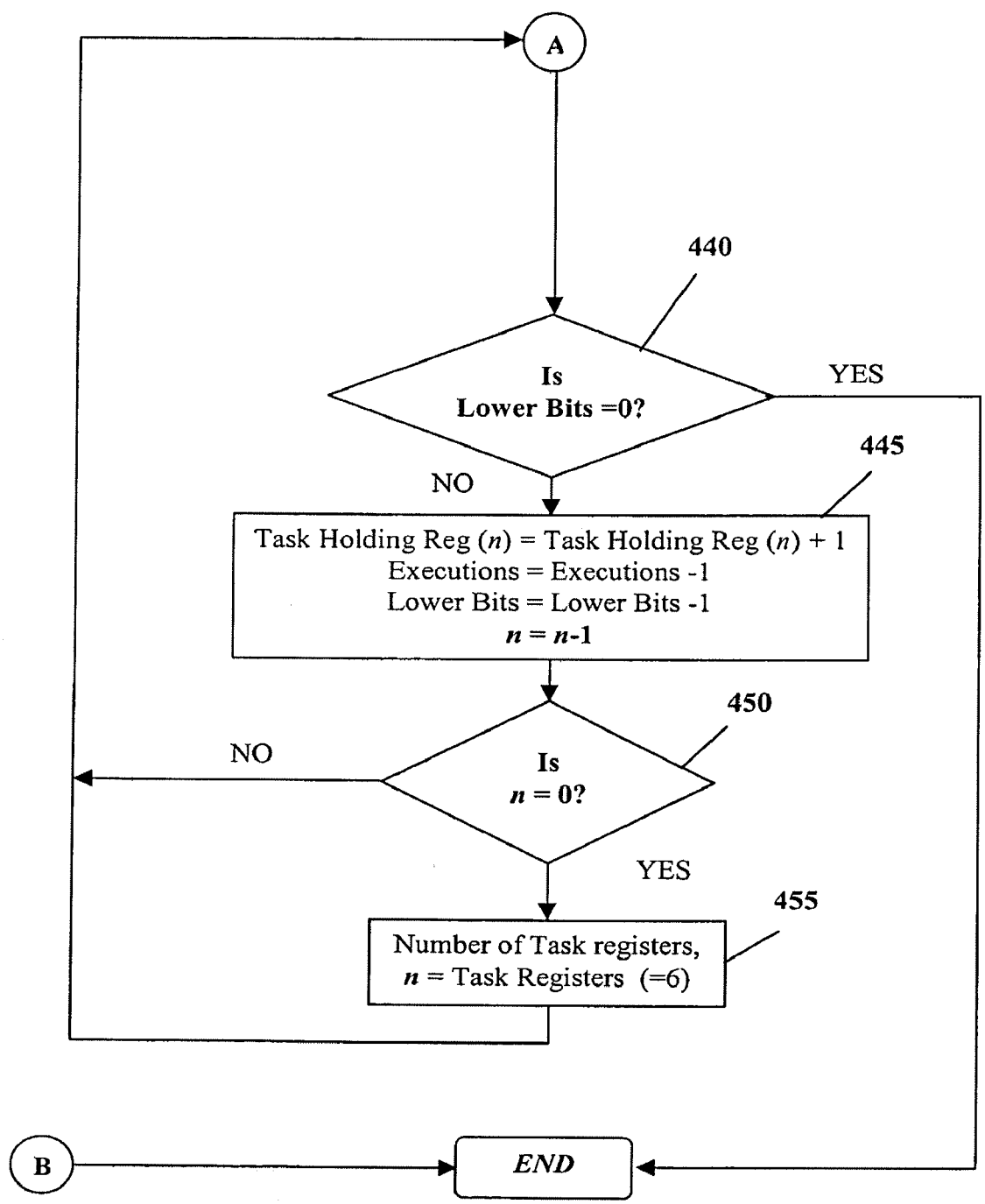

FIG. 3 schematically represents a hardware implementation and the following example. FIGS. 4A and 4B present corresponding steps of this hardware in flow chart form. Consider a design that has 6 task count holding registers 340. Suppose that an application needs 52 executions, using 6 task registers 310. The end result distribution of executions among the 6 task count holding registers 340 are 9, 9, 9, 9, 8, 8. In this example, as there are six task count holding registers, three bits are effectively required to address all of these six registers. Table 1 below presents decimals, hexadecimals and binary representations of the number of executions, in this case 52.

TABLE 1

Number of executions = 52(DEC) = 34(HEX) = 0011 0100(BIN)

Figure 1:
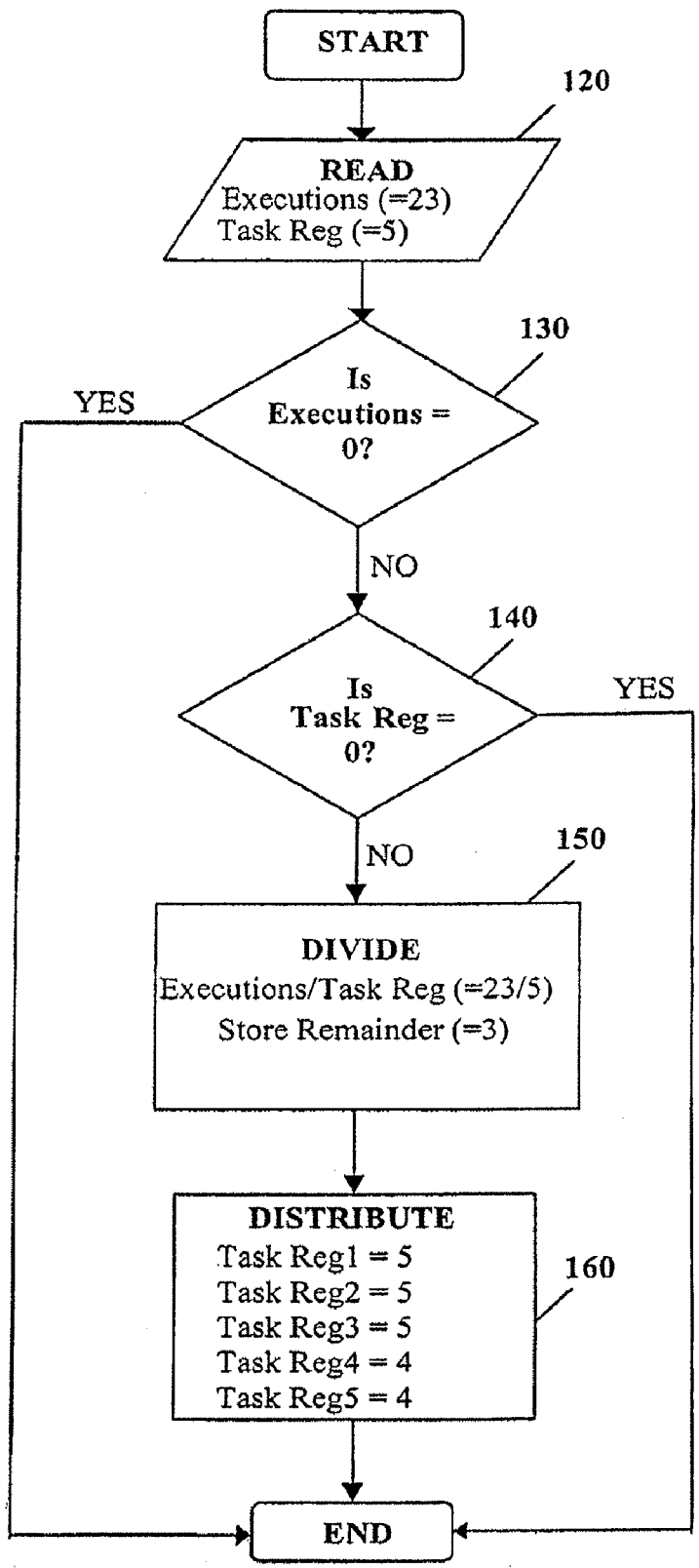
FIG. 1 is a flow chart of an existing task distribution technique using a division operation.
Figure 2:
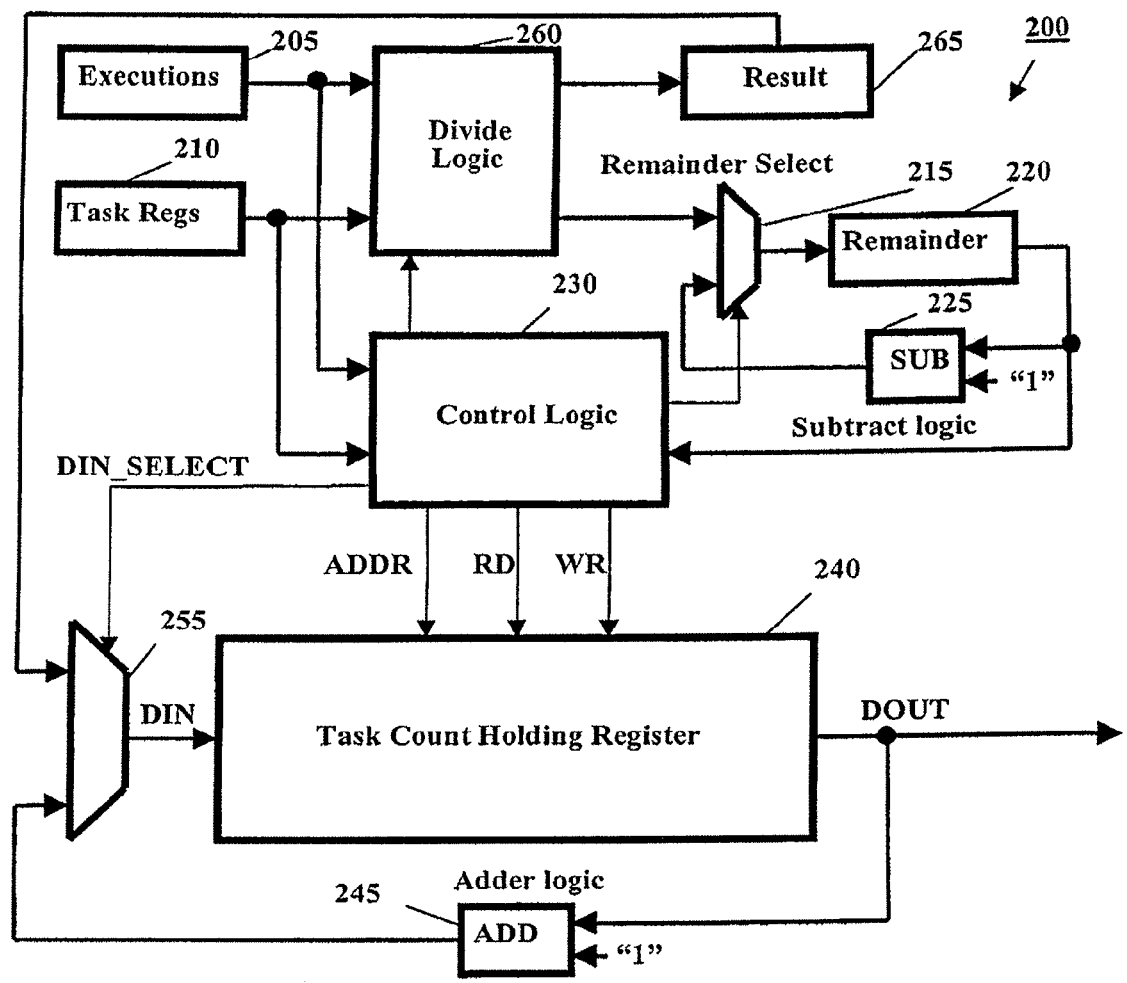
FIG. 2 is a schematic diagram of an existing hardware implementation for the task distribution technique of FIG. 1, which uses a division logic component.

FIGS. 4A and 4B jointly present a flow chart of steps performed by the hardware of FIG. 3. The hardware and steps are described with reference to each other, using the steps noted in the flow chart as a framework. The number of executions are distributed among the task count holding registers 340. For the purposes of the following example, 6 task count registers are assumed. First, observe that FIG. 3 does not have a division logic block, as does FIG. 2. The number of executions in stored in an executions register 305.

Step 405 Initially, the number of executions to be distributed is copied to the remainder register 320 in step 405. Depending on the number of task registers selected, as specified by the value in the tasks register 310, the control logic 330 generates addresses to the RAM 340, which is used to store number of executions for each task. In this case, the number of task registers selected is six. The task count holding register 340 is initialized with "zero" values for the task executions.

Step 410 The control logic 330 determines whether the number of Executions, or the number of task registers 310 is zero. If either value is zero, then the procedure proceeds no further. Otherwise, processing proceeds to step 420.

Step 415 At this stage, the number of Task Reg is loaded again for counting purposes in relation to steps 430 and 435 as described below. This step 415 is performed as many times is required to perform 420 to distribute the Upper Bits determined in step 420 to the task count holding registers 340 in step 430.

Step 420 The data pattern for the number of Executions is split into two parts, namely a first part of Lower Bits comprising the Least Significant Bits (LSBs), and a second part of Upper Bits comprising the complementary Most Significant Bits (MSBs). The number of LSBs comprising the Lower Bits is selected to be sufficient to address each of the task registers to which executions are distributed. In this case, in which there are 6 task registers, the number of bits required to address all 6 task registers is three bits. Three bits can of course address up to 8 task registers. The Upper Bits then, by definition, comprises the remaining complementary balance of the bit pattern. This remaining part of the bits is copied to a Upper-bits register present in the control logic 330, and into each of the addressed task count holding registers 340.

Step 425 The control logic 330 determines whether the value of the Upper Bits is zero. If so, processing proceeds directly to a second stage by resuming with step 455.

Step 430 Each of the task count holding registers 340 is addressed in turn, and the data value stored therein is incremented by the value stored as Upper Bits. In step 430, a task count holding register 340 is addressed, and incremented accordingly. Similarly, the number of Executions is correspondingly decremented by Upper Bits. A counting variable n, initially loaded with a value corresponding with the number of the task registers, is decremented to keep track of addressing each task count holding register 340.

Step 435 A check is made of whether the counting variable n has been incremented to zero. If not, steps 430 and 435 are repeated for each of the task count holding registers 340. Once all task count holding registers 340 are incremented (and balancing decrement operations performed), the counting variable n becomes zero, and processing returns to step 415.

Step 440 This second stage of the procedure is initiated once Upper Bits is determined to be zero. A determination is made whether the Lower Bits are zero. This would be the case if the number of executions forms an exact multiple of the number of task count holding registers 340. If so, the procedure ends, as the executions must in this case be fully distributed evenly between the task count holding registers 340. Otherwise, a number of executions remain to distribute unevenly between the task count holding registers 340 in steps 445 and 450.

Step 445 Step 445 is similar to step 430, except that the incremental value is one rather than the value of Upper Bits. The contents of each task count holding register 340 is incremented by one in step 445 using the adder logic 345. For each increment, the number of Executions/Lower Bits is also correspondingly decremented, to account for the total number of executions to be performed. The counting variable n, initially set for the first pass of step 445 in step 415, is also decremented to account for each task count holding register 340.

Step 450 A determination is made whether the counting variable n is zero, in the same manner and for the same purpose as determined in step 435. If not, steps 445 is repeated only if the lower bits are not zero in step 440, for each of the task count holding registers 340. Once all task count holding registers 340 are incremented (and balancing decrement operations performed), the counting variable n becomes zero, and processing returns to step 455.

Step 455 Once a round of executions is distributed in step 445, the value of the counting variable is reset before for counting and addressing purposes, as with step 415.

The presented example assumes that the number of executions is 00110100 (BIN). The two parts of the number 00110100 are 00110 (Upper Bits) and 100 (Lower Bits). Load the first part, 00110, in all the 6 task count holding registers 340. Each time, subtract 00110 from the number of executions. In the first iteration, when the last task count holding register 340 is updated in step 430, all the six task registers will have a count 00110, and the number of executions will be 00010000 (00110100–six times 00110). After updating the last task count holding register 340, perform the above steps 415 to 430 to compute the new pair of numbers. This time, the new number 00010 (that is, 00010|000), without the 3 LSBs, is added to the contents of the task count holding register 340. Continue these steps until the new number reaches zero, as determined by step 425. Steps 421 and 422 represent successive iterations of step 420, as the upper part of the bit pattern assumes successively decreasing values of 00010 and, finally, 00000.

Now the remaining 3 bits (lower bits) are distributed, by adding "1" to each of the task count holding register 340 and decrementing "1" from the lower bits until the lower bits become zero.

Tables 2 and 3 below present a detailed account of the distribution process of 52 executions among 6 task count holding registers as described herein. Table 2 summarises the initial data values, and Table 3 recounts the procedure as computations proceed.

TABLE 2

Number of executions = 52(DEC) = 34(HEX) = 00110 100(BIN), represented in 8 bits
Number of task count holding registers TR = 6
Number of bits required to address 6 registers = 3
Splitting the executions in two parts, of 5 and 3 bits respectively are 00110 and 100
UPPER part = 00110
LOWER part = 100
Load UPPER number 00110 in all 6 registers

TABLE 3

| Task count holding register | Number of executions remaining |
|---|---|
| TR1 = 00110 | 00110100 − 00110 = 00101110 |
| TR2 = 00110 | 00101110 − 00110 = 00101000 |
| TR3 = 00110 | 00101000 − 00110 = 00100010 |
| TR4 = 00110 | 00100010 − 00110 = 00011100 |
| TR5 = 00110 | 00011100 − 00110 = 00010110 |
| TR6 = 00110 | 00010110 − 00110 = 00010000 |

The number of executions remaining at the end of the first round is 00010000. Following the above-described steps computes a new UPPER number. After splitting the remaining executions, the new UPPER number is 00010. This is computed by splitting 00010000 into two parts, as 00010 and 000. Add the UPPER number to the task count holding register, and subtract the same from the remaining number of executions. Table 4 below indicates contents of the task count holding register, and the number of executions remaining.

TABLE 4

| Task count holding register | Number of executions remaining |
|---|---|
| TR1 = 00110 + 10 = 1000 | 00010000 − 10 = 00001110 |
| TR2 = 00110 + 10 = 1000 | 00001110 − 10 = 00001100 |
| TR3 = 00110 + 10 = 1000 | 00001100 − 10 = 00001010 |
| TR4 = 00110 + 10 = 1000 | 00001010 − 10 = 00001000 |
| TR5 = 00110 + 10 = 1000 | 00001000 − 10 = 00000110 |
| TR6 = 00110 + 10 = 1000 | 00000110 − 10 = 00000100 |

At the end of the second round, the remaining executions are 100 (in binary form). At this stage, the remaining executions are distributed until the number of executions becomes zero. Table 5 below illustrates the successive sequence of data values that lead to the end result.

TABLE 5

| Task count holding register | Number of executions remaining |
|---|---|
| TR1 = 1000 + 1 = 1001 = 9 | 100 − 1 = 11 |
| TR2 = 1000 + 1 = 1001 = 9 | 11 − 1 = 10 |
| TR3 = 1000 + 1 = 1001 = 9 | 10 − 1 = 01 |
| TR4 = 1000 + 1 = 1001 = 9 | 01 − 1 = 00 |
| TR5 = 1000 = 8 | |
| TR6 = 1000 = 8 | |

The distribution is complete when the number of executions reaches zero. In above example, TR1 to TR6 have respectively 9, 9, 9, 9, 8, 8 executions allocated.

CONCLUSION

A hardware implementation for performing task distribution is described herein, together with the computational steps performed by this hardware. Task executions can start immediately after a first update of task count registers. The remaining iterations are performed in the background as hidden cycles. Various alterations and modifications can be made to the techniques and arrangements described herein, as would be apparent to one skilled in the relevant art.

We claim:

1. A method for distributing task executions comprising the steps of:
    storing in a remainder register a data value representing a number of executions to be distributed between multiple task count registers;
    incrementing a value stored in each of the task count registers by an amount corresponding with the data pattern of a plurality of the most significant bits (MSBs) of the value stored in the remainder register;
    decrementing, for each corresponding increment, the value stored in the remainder register by the same amount used to increment the value stored in each of the task count registers; and
    distributing between the task count registers remaining executions represented by the decremented value stored in the remainder register.

2. The method of claim 1, farther comprising the step of repeating further steps of incrementing the task count registers and decrementing the remainder register if an amount corresponding with same most significant bits (MSBs) of the value stored in the remainder register is non-zero.

3. The method of claim 1, further comprising the step of determining whether the value stored in the same most significant bits (MSBs) of the remainder register is zero.

4. The method of claim 1, further comprising the step of determining whether the value stored in the complementary least significant bits (LSBs) of the remainder register is zero.

5. The method of claim 1, further comprising the step of successively incrementing each of the task count registers with a value of one while correspondingly decrementing the decremented value stored in the remainder register, until the value stored in the remainder register is zero.

6. The method of claim 1, further comprising the step of initializing to zero the values stored in the task count registers before the at least one step of incrementing the task count registers.

7. The method of claim 1, further comprising the step of initializing the remainder register to a value corresponding with the total number of executions to be performed.

8. The method of claim 1, wherein the number of least significant bits (LSBs) complementary to the plurality of the most significant bits (MSBs) is sufficient to address the number of the task count registers.

9. Digital hardware for distributing task executions, the hardware comprising:
    a remainder register for storing a data value representing a number of executions to be distributed between to the task count registers;
    task count registers for storing a number of executions to be performed by a respective task;
    adder logic for incrementing the value stored in the task count registers;
    subtract logic for decrementing the value stored in the remainder register;
    control logic for coordinating operations of the adder logic and the subtract logic to:
        (i) increment a value stored in each of the task count registers by an amount corresponding with the data pattern of a plurality of the most significant bits (MSBs) of the value stored in the remainder register;
        (ii) decrement, for each corresponding increment, the value stored in the remainder register by the same amount used to increment the value stored in each of the task count registers; and
        (iii) distribute between the task count registers remaining executions represented by the decremented value stored in the remainder register.

* * * * *